March 25, 1952 J. BOLSEY 2,590,497
COMBINED CAMERA AND PROJECTOR ARRANGEMENT
Filed Oct. 11, 1949 3 Sheets-Sheet 1

INVENTOR.
Jacques Bolsey
BY

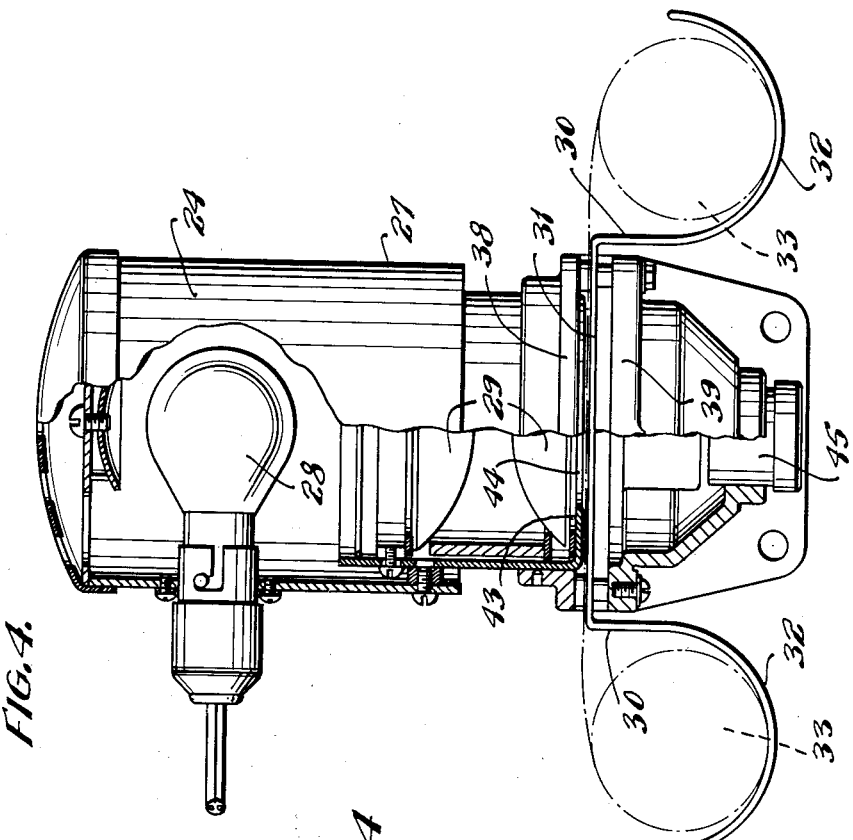
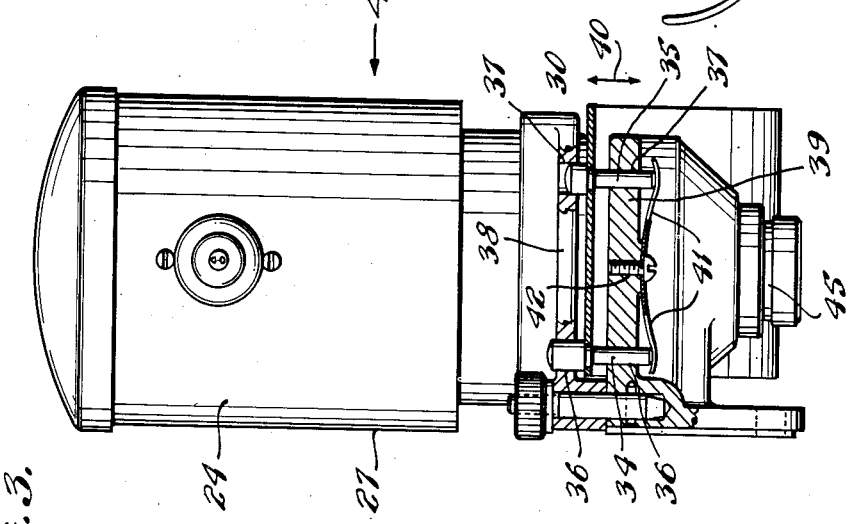

March 25, 1952  J. BOLSEY  2,590,497
COMBINED CAMERA AND PROJECTOR ARRANGEMENT
Filed Oct. 11, 1949  3 Sheets-Sheet 3
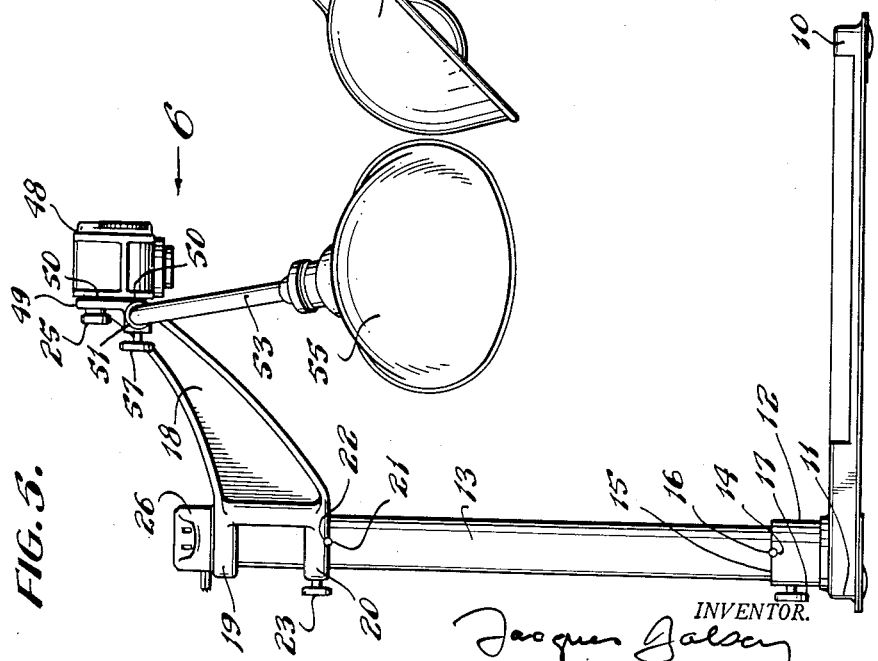

Patented Mar. 25, 1952

2,590,497

UNITED STATES PATENT OFFICE 2,590,497

COMBINED CAMERA AND PROJECTOR ARRANGEMENT

Jacques Bolsey, New York, N. Y.

Application October 11, 1949, Serial No. 120,637

2 Claims. (Cl. 88—24)

My present invention relates to a photographic arrangement, and more particularly to photographic camera arrangements for taking pictures of drawings and documents on cinematographic films, and to photographic projector arrangements for projecting such films upon a reading surface.

It is an object of my present invention to provide arrangements of the above type which can be taken apart and assembled swiftly by anybody without expert knowledge in this field.

It is a further object of my present invention to provide photographic arrangements of the above type which do not need complicated adjustment but are ready for operation immediately after they are assembled.

With the above objects in view, a photographic arrangement according to my present invention comprises in combination a plate-shaped horizontal base having a rear edge, a vertically extending support, holding means on the plate-shaped horizontal base near the rear edge thereof easily detachably holding the vertically extending support at the lower end thereof, a forward projecting arm, attaching means at the upper end of the vertically extending support easily detachably securing the rear end of the forward projecting arm to the upper end of the vertically extending support, and means on the front end of the forward projecting arm for easily detachably attaching thereto a photographic device.

A particularly preferred arrangement of the type proposed by me includes a plate-shaped horizontal base having a rear edge, a vertical post, an annular holding member on the plate-shaped horizontal base near the rear edge thereof, holding the lower end portion of the vertical post, a forward projecting arm, an annular attaching sleeve at the rear end of the forward projecting arm, easily removably slid over the upper end of the vertical post, a locating notch in the bottom edge of the annular attaching sleeve, a corresponding locating pin on the vertical post spaced a small distance from the top end thereof, engaging the locating notch in the bottom edge of the annular attaching sleeve so as to prevent sliding down on the annular attaching sleeve along the vertical post and turning of the sleeve relative to the post; means at the front end of the forward projecting arm for easily detachably attaching thereto a photographic device, and a light excluding frusto-conical hood adapted to be placed with its wider end on the plate-shaped horizontal base and provided in its upwardly extending faces with observation windows.

The novel features which I consider as characteristic for my invention are set forth in particular in the appended claims. The invention itself, however, both as to its construction and its method of operation, together with additional ojects and advantages thereof, will be best understood from the following description of specific embodiments when read in connection with the accompanying drawings, in which:

Fig. 3 is a side view, partly in section, of the projector means forming part of the photographic arrangement shown in Figures 1 and 2;

Fig. 4 is a front view of the projector means shown in Fig. 3, partly in section and seen in direction of arrow 4 on Fig. 3;

Fig. 5 is a side view of the arrangement shown in Fig. 1 equipped with illuminating and camera means; and Fig. 6 is a front view of the arrangement shown in Fig. 5, seen in direction of arrow 6 on Fig. 5.

Figure 2:
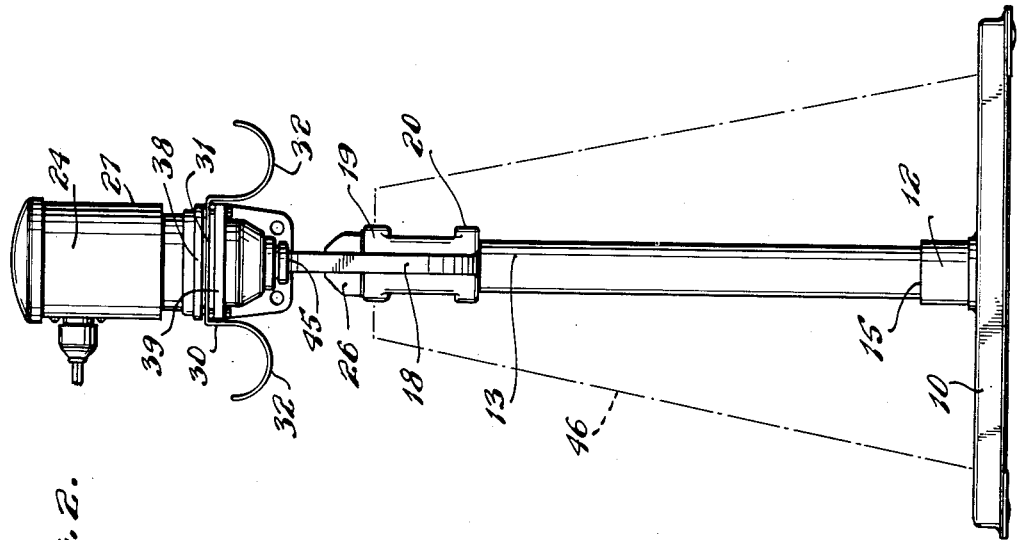
Fig. 2 is a front view of the arrangement shown in Fig. 1, seen in direction of arrow 2 on Fig. 1.

My new arrangement includes a plate-shaped horizontal base 10 provided near its rear edge 11 with an annular holding sleeve 12 which is open at its top.

Into this annular holding sleeve 12 is inserted the vertical post 13. In order to properly locate the post within the annular holding sleeve 12, I provide, in accordance with my invention, a notch 14 in the upper edge 15 of the sleeve 12 and a corresponding pin 16 on the post 13, fitting into notch 14, as shown.

In order to prevent undesired sliding out of the post 13 from the sleeve 12, I provide the screw 17 passing through a corresponding screw threaded hole in sleeve 12 and pressing against post 13.

At the upper end of the post 13, I provide the arm 18 which is provided with two annular holding extensions 19 and 20, fitting on the upper end portion of the post 13, as shown. In order to prevent undesired downward sliding of the arm 18 and undesired turning of this arm relative to the post, I provide on the post the locating and holding pin 21 fitting into the notch 22 provided in the bottom edge of the lower annular extension 20, as shown.

In addition to these locating means, I provide also the screw 23, passing through a screw threaded hole in the annular extension 20 and passing against the post 13.

In this manner, it is easily possible to assemble the entire arrangement without the necessity of complicated adjustments.

At the front end of arm 18, I provide the projector means 24 described below in detail. These projector means are attached to the arm 18 by means of screw 25 so as to face the plate-shaped horizontal base 10.

On top of the upper annular extension 19 forming part of the arm 18, I mount the electric socket 26, connectible by means of the electric cord 27 and plug 27' with an electric circuit.

The projector means 24 are shown in detail in Figures 3 and 4.

They include a lamp housing 27 enclosing the projector lamp 28 and the condenser system 29.

In order to enable use of the projector means for projection of pictures recorded on a cinematographic film, I provide the combined film holder and pressure plate 30 which consists of a middle portion 31 serving as pressure plate and two semi-cylindrical end portions 32 and 33 serving for holding the film rolls 33, indicated in Figures 3 and 4 in dotted lines.

As clearly shown in Figure 3, the combined film holder and pressure plate 30 is guided and held in proper position by the pins 34 and 35 secured to the plate and freely slidably passing through corresponding holes 36 and 37, respectively, provided in the brackets 38 and 39 secured to the lamp housing 27.

These brackets 38 and 39 are arranged spaced from each other as shown so as to permit a slight movement of the pressure plate portion 31 of the plate 30 in vertical direction as indicated by arrow 40. The leaf spring 41 secured at 42 to the bracket 38 permanently forces the plate portion 31 of plate 30 upward into contact with the bottom face of the bracket 38 so as to properly guide the film strip passing between this bracket 38 and pressure plate portion 31.

In accordance with my present invention, the pins 35 are slightly shorter than the pins 34 so as to leave a free space between their upper ends and the bracket 38 for insertion of the film strip when the pressure plate is pressed downward in direction away from bracket 38.

The lamp housing 27 is closed at its bottom by a bottom wall 43 provided in the usual manner with a projection aperture 44. Under the bracket 39, the projection lens 45 is arranged as shown in Fig. 4.

Figure 1:
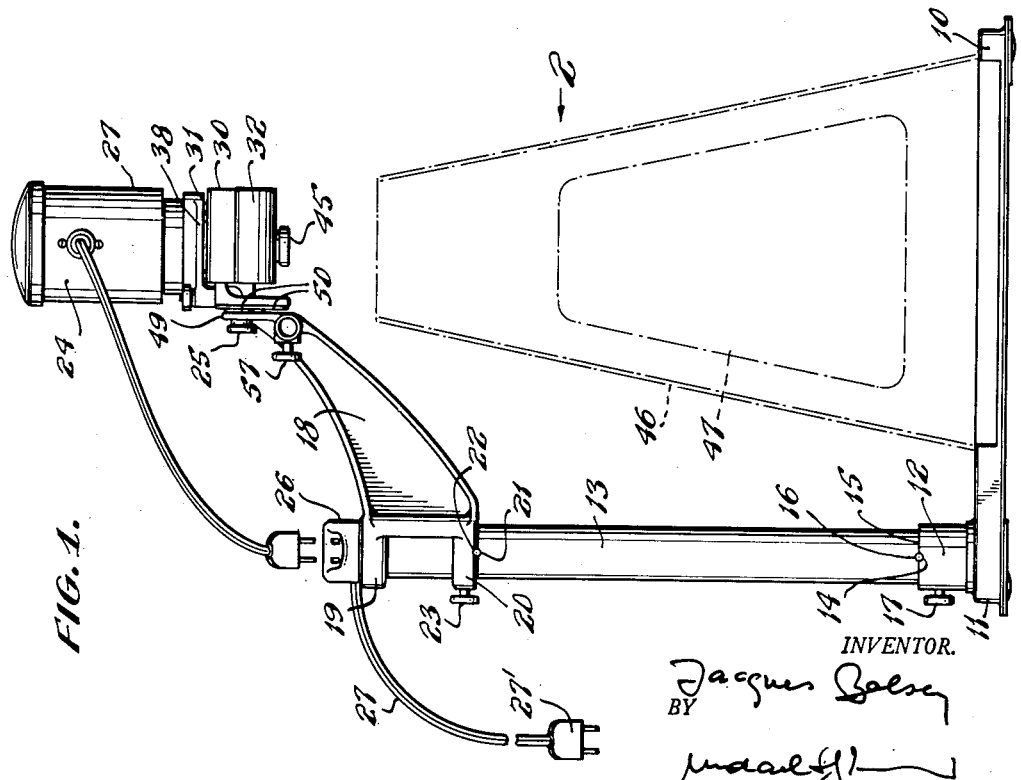
Fig. 1 is a side view of a photographic arrangement according to my present invention, equipped with projector means.

Use of the above described projection arrangement during daytime is made possible by the independent hood 46 which has the shape of a rectangular pyramid and can be placed on the base 10, as shown in Figure 1. This hood 46 is provided with relatively large apertures 47, enabling observation of the upper reading surface of the base 10.

In order to enable taking of pictures of drawings and documents on a cinematographic film strip with the above described arrangement, the projection means 24 are easily removably attached by screw 25 to the arm 18. It is only necessary to remove the projection means 24 and to replace them by a camera 48, as clearly shown in Figure 5.

For this purpose, the front wall 49 of arm 18 is preferably provided with locating means 50 fitting into corresponding depressions in the bottom wall of the camera 48 so as to enable attachment of the latter to the arm 18 in properly adjusted position without the necessity of lengthy adjustment.

Furthermore, the arm 18 is provided at its front end with two sleeve-shaped projections 51 and 52 into which fit the supporting rods 53 and 54, respectively, of the illuminating lamps 55 and 56, as shown in Figure 6. Of course, these lamps are attached to arm 18 only if and when the arrangement is used for taking pictures of drawings or other papers placed on the base 10.

The screws 57 passing through screw threaded holes in the sleeves 51 and 52 serve for retaining the supporting rods 53 and 54 of the lamps in proper position.

The photographic arrangement described above is mainly adapted to be used for taking pictures of drawings and documents of equal size; if smaller drawings and documents are photographed, the taken pictures will cover only part of the image field on the film.

It will be understood that each of the elements described above, or two or more together, may also find a useful application in other types of photographic arrangements, differing from the types described above.

While I have illustrated and described the invention as embodied in photographic camera and projector arrangements for producing and projecting microfilms, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A photographic arrangement comprising in combination a plate-shaped horizontal base having a rear edge; a vertical post; an annular holding member on said plate-shaped horizontal base near said rear edge thereof, slidably enclosing and thereby easily detachably holding the lower end portion of said vertical post; locating means combined with said annular holding member for preventing turning of said vertical post relative to said plate-shaped horizontal base while slidably enclosed and easily detachably held by said annular holding member; a forward projecting arm; an annular attaching sleeve at the rear end of said forward projecting arm easily removably slid over the upper end of said vertical post; locating means for preventing sliding down of said annular attaching sleeve along said vertical post and turning of said sleeve relative to said post; attaching means at the front end of said forward projecting arm for easily detachably attaching thereto a photographic device; an electric light source forming part of said photographic device; a first electric cord secured at one end to said electric light source; a first electric plug secured to the other end of said first electric cord, said first electric cord and first electric plug being detachable together with said photographic device; an electric socket mounted on said forward projecting arm into which said first electric plug might be plugged; a second electric cord secured at one end to said electric socket; and a second electric plug secured to the other end of said second electric cord and adapted to be connected with a source of electric current.

2. A photographic arrangement comprising in combination a plate-shaped horizontal base having a rear edge; a vertical post; an annular holding member on said plate-shaped horizontal base near said rear edge thereof, holding the lower end portion of said vertical post; a forward projecting arm; an annular attaching sleeve at the rear end of said forward projecting arm, easily removably slid over the upper end of said vertical post; a locating notch in the bottom edge of said annular attaching sleeve; a corresponding locating pin on said vertical post spaced a small distance from the top end thereof, engaging said locating notch in the bottom edge of said annular attaching sleeve so as to prevent sliding down of said annular attaching sleeve along said vertical post and turning of said sleeve relative to said post; means at the front end of said forward projecting arm for easily detachably attaching thereto a photographic device; an electric light source forming part of said photographic device; a first electric cord secured at one end to said electric light source; a first electric plug secured to the other end of said first electric cord, said first electric cord and first electric plug being detachable together with said photographic device; an electric socket mounted on said forward projecting arm into which said first electric plug might be plugged; a second electric cord secured at one end to said electric socket; and a second electric plug secured to the other end of said second electric cord and adapted to be connected with a source of electric current.

JACQUES BOLSEY.

REFERENCES CITED

The following references are of record in the file of this patent:

UNITED STATES PATENTS

| Number | Name | Date |
|---|---|---|
| 1,767,266 | Wappler | June 24, 1930 |
| 2,180,007 | Hopkins | Nov. 14, 1939 |
| 2,206,396 | Glass | July 2, 1940 |
| 2,312,294 | Worthington | Feb. 23, 1943 |
| 2,361,183 | Eddy | Oct. 24, 1944 |
| 2,403,892 | McFarlane | July 9, 1946 |